(12) United States Patent
Edmison et al.

(10) Patent No.: US 7,127,508 B2
(45) Date of Patent: Oct. 24, 2006

(54) METHOD AND SYSTEM OF MEASURING LATENCY AND PACKET LOSS IN A NETWORK BY USING PROBE PACKETS

(75) Inventors: Kelvin Ross Edmison, Ottawa (CA); Hans Frederick Johnsen, Kanata (CA); Walter Joseph Carpini, Stittsville (CA)

(73) Assignee: Tropic Networks Inc., Kanata (CA)

( * ) Notice: Subject to any disclaimer, the term of this patent is extended or adjusted under 35 U.S.C. 154(b) by 793 days.

(21) Appl. No.: 10/134,553

(22) Filed: Apr. 30, 2002

(65) Prior Publication Data

US 2003/0115321 A1 Jun. 19, 2003

Related U.S. Application Data

(60) Provisional application No. 60/340,840, filed on Dec. 19, 2001.

(51) Int. Cl.
*G06F 13/00* (2006.01)
(52) U.S. Cl. ...................................... 709/224
(58) Field of Classification Search ................ 709/223, 709/224, 235; 370/252, 352
See application file for complete search history.

(56) References Cited

U.S. PATENT DOCUMENTS

| | | | |
|---|---|---|---|
| 6,012,096 A | 1/2000 | Link et al. | |
| 6,321,264 B1 | 11/2001 | Fletcher et al. | 709/224 |
| 6,885,642 B1 * | 4/2005 | Jain et al. | 370/252 |
| 6,912,216 B1 * | 6/2005 | Smith et al. | 370/352 |

2001/0050903 A1 12/2001 Vanlint

FOREIGN PATENT DOCUMENTS

| | | |
|---|---|---|
| WO | WO 01/45349 A2 | 6/2001 |
| WO | 0165268 | 9/2001 |
| WO | 0191375 | 11/2001 |
| WO | WO 01/91375 A2 | 11/2001 |

OTHER PUBLICATIONS

Elwalid, Anwar; Jin, Cheng; Low, Steven; Widjaja, Indra; Mate: MPLS Adaptive Traffic Engineering; IEEE Infocom, 2001.
Telecommunication Standardization Sector of ITU, Recommendation I.610; Series I: Integrated Services Digital Network, Maintenance Principles, B-ISDN Operation and Maintenance Principles and Functions, (Geneva, 1991; revised Helsinki, 1993; revised in 1995 and 1999), Feb. 1999, pp. 1-78.
Telecommunication Standardization Sector of ITU, Recommendation I.356; Series I: Integrated Services Digital Network, Overall Network Aspects and Functions—Performance Objectives, B-ISDN ATM Layer Cell Transfer Performance, Mar. 2000, pp. 1-55.

* cited by examiner

*Primary Examiner*—Robert B. Harrell
(74) *Attorney, Agent, or Firm*—Victoria Donnelly

(57) ABSTRACT

The invention provides a method which involves inserting probe packets on a per service basis for transmission on a respective round trip; and for each service using the probe packets to calculate packet latency for probe packets which is representative of packet latency for all packets transmitted for the service. In some embodiments, data plane time stamps are used to accurately time probe latency. The invention also provides a method which involves inserting probe packets on a per service basis for transmission on a respective destination network element; and at the destination network element for a given service using the probe packets to calculate one way packet loss for the service.

24 Claims, 5 Drawing Sheets

| DATA FIELD | MEMORY SIZE (BYTES) |
|---|---|
| SOURCE TRANSMISSION TIME | 4 |
| SOURCE RECEIVE TIME | 4 |
| DESTINATION TRANSMISSION TIME | 4 |
| DESTINATION RECEIVE TIME | 4 |
| TRANSMISSION PACKET COUNT | 8 |
| RECEIVE PACKET COUNT | 8 |

FIG. 3

METHOD AND SYSTEM OF MEASURING LATENCY AND PACKET LOSS IN A NETWORK BY USING PROBE PACKETS

RELATED APPLICATION

This application claims the benefit of U.S. provisional application No. 60/340,840 filed Dec. 19, 2001.

FIELD OF THE INVENTION

The invention relates to methods and systems of measuring latency and packet loss in a network.

BACKGROUND OF THE INVENTION

With today's more complex networks ranging from corporate intranets and extranets to the Internet itself, there is tremendous pressure from telecom service providers as well as end customers to establish fully defined and measurable levels of service that can be directly affiliated with users or user groups. Most corporate intranets and metropolitan networks are built with the familiar IP routing protocol. IP, which transmits packets asynchronously, is a connectionless protocol that provides no guarantees about the timeliness or relative order of the packets. It is difficult to identify traffic congestion and network delays caused by malfunctioning network hardware. Telecom transmission links are inherently constrained by bandwidth. If packets are placed into the transmission queue faster than they are actually transported, packets usually will be delayed and some might eventually be dropped. It is difficult for carriers and ISPs to quantify these discarded packets and determine what are acceptable packet transmission delay thresholds on a per-customer basis.

Many high profile telecom service customers such as investment banks and government agencies are thirsting for definitive service level guarantees so that the appropriate telecom service level can be purchased for the transport of various types of mission-critical information.

The questions of how often can network packets be lost before the network service becomes useless, and how much delay is too long are some of the questions that telecom service users are asking the service carriers in an attempt to shore up definitive service guarantees and hold the carriers liable should the service agreements be violated. These questions do not have inherently right or wrong answers. If a network carrying mostly e-mail is out of service for an hour, some might not even notice. But for a system performing credit card validations, being out of service for an hour at a retail store could cause consumer protests. All networks have varying service qualities from time to time as traffic comes and goes. This is where the idea of Service Level Agreements (SLA) enters. SLAs are essentially promises on the part of the network service provider to each major user group that the level of service provided by the network will be within the bounds established by the SLAs. While 100% uptime may be every telecom service users' goal, 99% to 99.999% are more realistic averages. One key element of network SLAs is to stipulate the penalties for downtime during critical business hours. For instance, downtime at 2 a.m. may not disrupt the typical enterprise's business, but it could be unsatisfactory for an e-commerce application. Typically, compensation takes the form of service fee refund or free service for a pre-agreed upon number of days. Another key part of guaranteeing network service is the connection SLA, which basically means acceptable data losses and data latency (or data delays). According to a recent study by the telecommunications industry, it was found that a very small number of service providers actually detailed provisions for data loss (which results from data packets being dropped in congested networks) and data latency in their SLAs. To illustrate the range of acceptable data loss rates, one has to understand that for real-time applications such as Voice over IP, a data loss rate of 1% could prevent the application from operating effectively. On the other hand, a packet loss rate in the 5 percent range is quite acceptable for typical Internet browsing. Network SLAs are specified and quantified by the Quality of Service that an individual service customer can purchase. The QoS architecture is considered vital in maximizing network utilization while providing diverse service guarantees.

The underlying network hardware and software responsible for "policing" and allocating the appropriate resources for the Service Level Agreements should supplement the existing collection of Operations, Administration, Maintenance and Protection services currently in place on each network element for providing network metrics. In other words, the infrastructure needed for SLA implementation typically resides on the network element itself or some portion thereof.

Even though some current network equipment undergoes strenuous seismic, weather and extreme thermal tests to assure the high reliability of the hardware components which translates into network uptimes as high as 99.999% during the operational life of the network equipment, these hardware tests could not reveal real-time network delay as well as the packet drop counts (thus no method of formulating connection SLAs) during periods of network congestion. It would be advantageous to have an effective way of accurately determining transmission delay and packet drop data on a per-customer basis. The ability to define connection SLAs based on concrete data would give these telecom carriers a competitive advantage because it clearly delineates the type of service that an individual customer should be expecting.

SUMMARY OF THE INVENTION

Advantageously, the probe packet insertion methods and systems provided by the invention insert probe packets under control of the network as opposed to end users. This prevents the situation of malicious customers flooding messages which may cause performance metrics to be invalidated.

The solution is integrated with the transport system itself, and therefor the probe packets cannot be spoofed. An end user is not allowed to inject probe packets, but can only ask that probe packets be injected on their behalf. This provides enhanced security.

Advantageously, because the invention does not rely on end user to end user probe packet insertion but instead relies upon carrier port to carrier port probe packet insertion, a carrier can detect whether the performance problem exists within their network.

On broad aspect of the invention provides a method of measuring latency in a network. For each source, first network element, second network element, destination, service level parameter permutation for which latency is to be measured, the method involves at the first network element, receiving a first stream of packets from the source, the first stream of packets having at least one associated service level parameter; at the first network element, on an ongoing basis and independently of said source inserting into the stream of packets a probe packet to produce a probe packetized stream of packets, each probe packet containing a respective source transmit time which represents first network element time at a time of insertion of the probe packet; the first network element processing and forwarding each packet of the probe packetized stream of packets in accordance with the at least one associated service level parameter; at the second network element receiving The probe packetized stream of packets; the second network element extracting each probe packet and adding to each probe packet a respective destination receive time which represents second network element time at a time of extraction of the probe packet; the second network element receiving a second stream of packets from the destination, the second stream of packets having at least one associated service level parameter; the second network element independently of said destination inserting into the second stream of packets each extracted probe packet to produce a second probe packetized stream of packets after adding to each extracted probe packet a respective destination transmit time which represents second network element time at a time of insertion of the probe packet; the second network element processing and forwarding each packet of the second probe packetized stream of packets in accordance with the at least one associated service level parameter; the first network element receiving the second probe packetized stream of packets; the first network element extracting each probe packet from the second probe packetized stream of packets and adding to each probe packet a respective source receive time which represents first network element time at a time of extraction of the probe packet; and the first network element using the source transmit network time, the destination receive time, the destination transmit time, and the source receive time to compute a latency for each probe packet.

In some embodiments, the first network element combines the latencies of multiple probe packets to determine an average latency for round trip packet transmission for the particular source, first network element, second network element, destination, service level parameter permutation.

In some embodiments, the method further involves receiving a request for probe packet insertion in respect of the stream of packets; wherein at the first network element, inserting into the stream of packets probe packets to produce the probe packetized stream of packets is done in accordance with the request.

In some embodiments, the latency for each probe packet is computed according to: source receive time—(destination transmit time—destination receive time)—source transmit time.

In some embodiments, each probe packet comprises a packet which satisfies constraints of a protocol layer within which the packet resides, and has a type indication allowing each probe packet to be extracted at the first and second network elements.

In some embodiments, the first and second streams of packets are IP packets, and the probe packets are IP packets.

In some embodiments, the type indication allowing each probe packet to be extracted at the first and second network elements is added by: routing each packet through the network using an MPLS label stack including a lowest level label; for each packet which is one of said probe packets, adding a label below the lowest level label indicating the packet is a probe packet.

In some embodiments, the method further involves for each source, first network element, second network element, destination, service level parameter permutation: the first network element maintaining a respective first count of how many packets have been received from the source for transmission to the destination and including an up to date value of the first count in each probe packet transmitted from the first network element to the second network element; the second network element maintaining a respective second count of how many packets have been received from the source for forwarding to the destination; for each probe packet received at the second network element, determining a packet loss for transmission from the source to the destination by subtracting the second count from the first count.

In some embodiments, the method further involves for each source, first network element, second network element, destination, service level parameter permutation: the second network element maintaining a respective third count of how many packets have been received from the destination for transmission to the source and including an up to date value for the third count in each probe packet transmitted from the second network element to the source network element; the first network element maintaining a respective fourth count of how many packets have been received from the destination for forwarding to the source; determining a packet loss for transmission from the destination to the source by subtracting the third count from the fourth count.

In some embodiments, the method further involves using the times inserted in the probe packets to calculate a first estimate of one way jitter for traffic from the first network element to the second network element and a second estimate of one way jitter for traffic from the second network element to the first network element.

In some embodiments, the one way jitter is computed according to: $Jitter_{AZ1-2}=(T_{Z21}-T_{A21})-(T_{Z11}-T_{A11})$ wherein $T_{Aij}$ is the time measured in timing domain of the network element A probe packet i, step j, and $T_{Zij}$ is the time measured in timing domain of network element Z, wherein network element A is the first network element and network element Z is the second network element for said first estimate of one way jitter and wherein network element A is the second network element and network element Z is the first network element for the second estimate of one way jitter.

In some embodiments, the method further involves generating the probe packets in a separate processor from a network processor used for regular packet forwarding so as to minimize effects of real time behaviour of the packet forwarding, with the exception of the network processor adding the time so as to allow the time to be as accurate as possible, and not introduce overheads involved in probe packet generation and insertion into the packet streams.

Another broad aspect of the invention provides a method of measuring packet loss in a network. The method involves for each source, first network element, second network element, destination, service level parameter permutation for which packet loss is to be measured: at the first network element, receiving a first stream of packets from the source, the first stream of packets having at least one associated service level parameter; the first network element maintaining a respective first count of how many packets have been received from the source for transmission to the destination; at the first network element, on an ongoing basis and independently of said source inserting into the stream of packets a probe packet to produce a probe packetized stream of packets, each probe packet containing a most recent value for the first count; the first network element processing and forwarding each packet of the probe packetized stream of packets in accordance with the at least one associated service level parameter; at the second network element, receiving the probe packetized stream of packets; the second network element maintaining a respective second count of how many packets have been received from the source for forwarding to the destination; the second network element extracting each probe packet from the probe packetized stream and determining a packet loss for transmission from the source to the destination by subtracting the second count from the first count.

Another broad aspect of the invention provides a method of measuring one way jitter in a network which involves for each source, first network element, second network element, destination, service level parameter permutation for which one way jitter is to be measured: at the first network element, receiving a first stream of packets from the source, the first stream of packets having at least one associated service level parameter; at the first network element, on an ongoing basis and independently of said source inserting into the stream of packets a probe packet to produce a probe packetized stream of packets, each probe packet containing a respective source transmit time which represents first network element time at a time of insertion of the probe packet; the first network element processing and forwarding each packet of the probe packetized stream of packets in accordance with the at least one associated service level parameter; at the second network element, receiving the probe packetized stream of packets; the second network element extracting each probe packet and determining a respective destination receive time which represents second network element time at a time of extraction of the probe packet; using the source transmit time and the destination receive time to calculate an estimate of one way jitter for traffic from the first network element to the second network element.

Another broad aspect of the invention provides a network element comprising a first input port, a first packet forwarder and a first probe packet manager; the first input port being adapted to receive a first stream of packets from a source for a destination, the first stream of packets having at least one associated service level parameter; the first probe packet manager adapted to, on an ongoing basis and independently of said source generate a probe packet and pass each probe packet to the first packet forwarder; the first packet forwarder being adapted to add to each probe packet a respective source transmit time which represents a current network time and to insert the probe packet into the stream of packets to generate a first probe packetized stream of packets; the first packet forwarder being further adapted to forward each packet of the probe packetized stream of packets on towards the destination in accordance with the at least one associated service level parameter.

Another broad aspect of the invention provides such a network element in combination with a network comprising a second network element, the second network element comprising a second input port, a second packet forwarder, and a second probe packet manager; the second input port being adapted to receive a second stream of packets from the destination for the source; the second packet forwarder being adapted to receive the probe packetized stream of packets, and to add to each probe packet as the probe packet is received a destination receive time and pass the probe packet to the second probe packet manager; the second probe packet manager adapted to pass each probe packet received back to the second packet forwarder; the second packet forwarder being adapted to add to each probe packet received from the second probe packet manager a respective destination transmit time which represents a current network time and to insert the probe packet into the second stream of packets to generate a second probe packetized stream of packets; the second packet forwarder being further adapted to forward each packet of the second probe packetized stream of packets on towards the source in accordance with the at least one associated service level parameter; the first packet forwarder being further adapted to receive the second probe packetized stream of packets, and add to each probe packet received a respective source receive time which represents first network element time at a time of extraction of the probe packet and pass the probe packet to the first probe packet manager; the first probe packet manager being further adapted to compute a packet latency for each probe packet using the source transmit network time, the destination receive time, the destination transmit time, and the source receive time.

Another broad aspect of the invention provides a method which involves inserting probe packets on a per service basis for transmission on a respective round trip; and for each service using the probe packets to calculate packet latency for probe packets which is representative of packet latency for all packets transmitted for the service. In some embodiments, data plane time stamps are used to accurately time probe latency.

Another broad aspect of the invention provides a method which involves inserting probe packets on a per service basis for transmission on a respective destination network element; and at the destination network element for a given service using the probe packets to calculate one way packet loss for the service.

BRIEF DESCRIPTION OF THE DRAWINGS

Preferred embodiments of the invention will now be described with reference to the attached drawings in which:

FIG. 3 is an example set of fields contained in a probe packet;

FIG. 4 shows an example of a round trip for a probe packet and how the various fields are filled in.

DETAILED DESCRIPTION OF THE PREFERRED EMBODIMENTS

According to an embodiment of the invention, probe packets are provided to give network administrators continual feedback and monitoring capabilities. This allows more precise monitoring of network health and network failures should the network data paths within the network suffer from traffic congestion or network failures.

Figure 1:
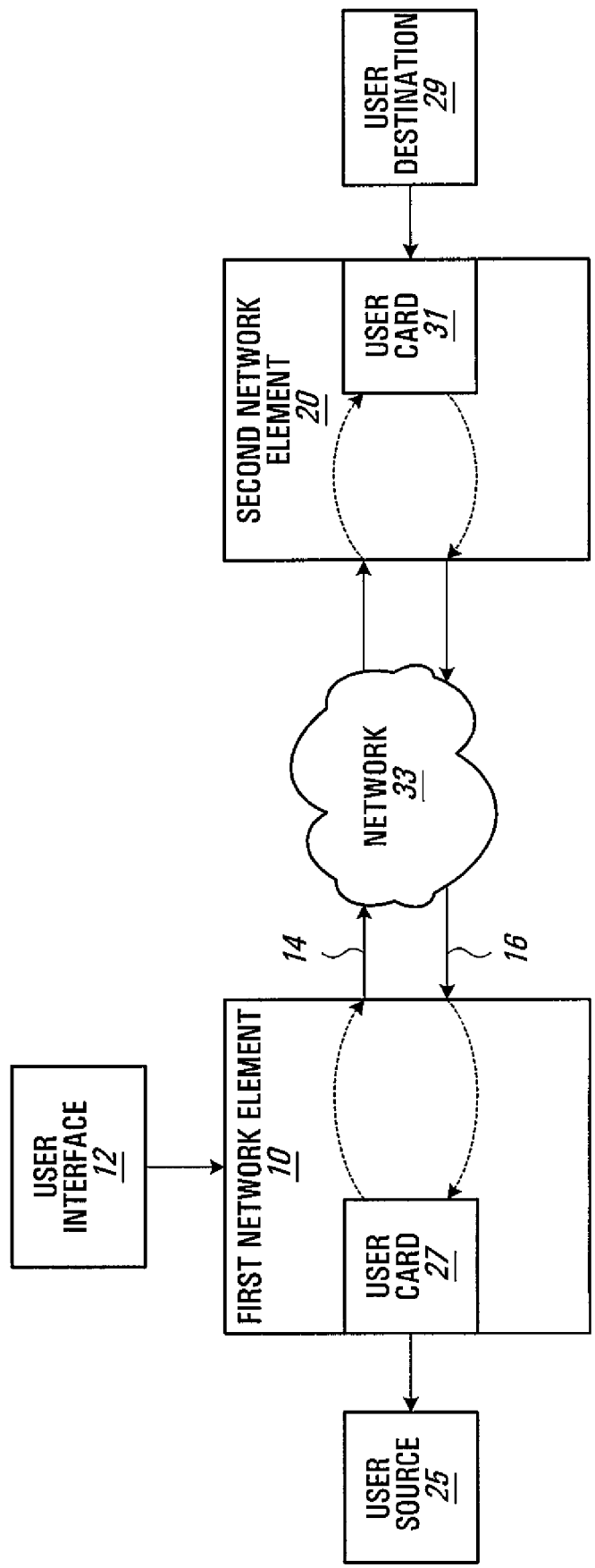
FIG. 1 is a block diagram of a network adapted to use probe packet to implement packet latency and packet loss measurement methods provided by embodiments of the invention.

Referring now to FIG. 1, shown is a schematic diagram of a network provided by an embodiment of the invention which is adapted to use probe packets to implement the packet latency and packet loss measurement methods. Shown is a first network element 10 and a second network element 20. There is a forward user data path 14 from the first network element 10 to the second network element 20, and a return user data path 16 from the second network element 20 to the first network element 10. The details of the actual data paths 14,16 are not shown. However, the paths are intended to include all functionality involved from the point traffic enters the network to the point where the traffic leaves the network. For example, shown is a user source 25 connected to user card 27 on the first network element, and a user destination 29 connected to a user card 31 on the second network element. For this example, the methods are intended to measure the latency and packet loss between user ports on the user card 27, user ports on the user card 31, and back. These may include multiple hops through a network indicated generally by 33 for example.

The forward user data path 14 and the return user data path 16 together constitute a round trip path for which packet latency and packet loss are to be determined. There may be multiple such round trip paths for a given user's traffic if a given user is subscribing to multiple service levels. For the remainder of the description, a "service" will constitute a given round trip path and associated class of service. The methods can be applied to individual such round trip paths, or in some embodiments, the methods can be applied to aggregates of multiple paths.

Preferably, the port or user cards such as user card 27 are bi-directional to the user source 25. The two paths 14,16 are defined together for bi-directional traffic flow to the user card 31 at the other side of the network. Depending upon protocols being employed, the two paths 14,16 may be considered separate paths (e.g. MPLS, LSPs) or may be considered a single bi-directional path. Preferably, the same service level is provided on each direction although the bandwidth may be different.

A user interface 12 is shown connected to the first network element 10. The user interface is intended to represent logically any device/interface where a user can control the injection of probe packets. The probe packet based packet latency and packet loss measurement methods can be applied to each such arrangement within a network to provide individual packet latencies and packet loss measurements for each first, second network element pair, and for individual services between such pairs. The user interface 12 does not necessarily need to be a separate physical entity, and might not be locally connected to the network elements, alternatively being in some centralized location.

Figure 2:
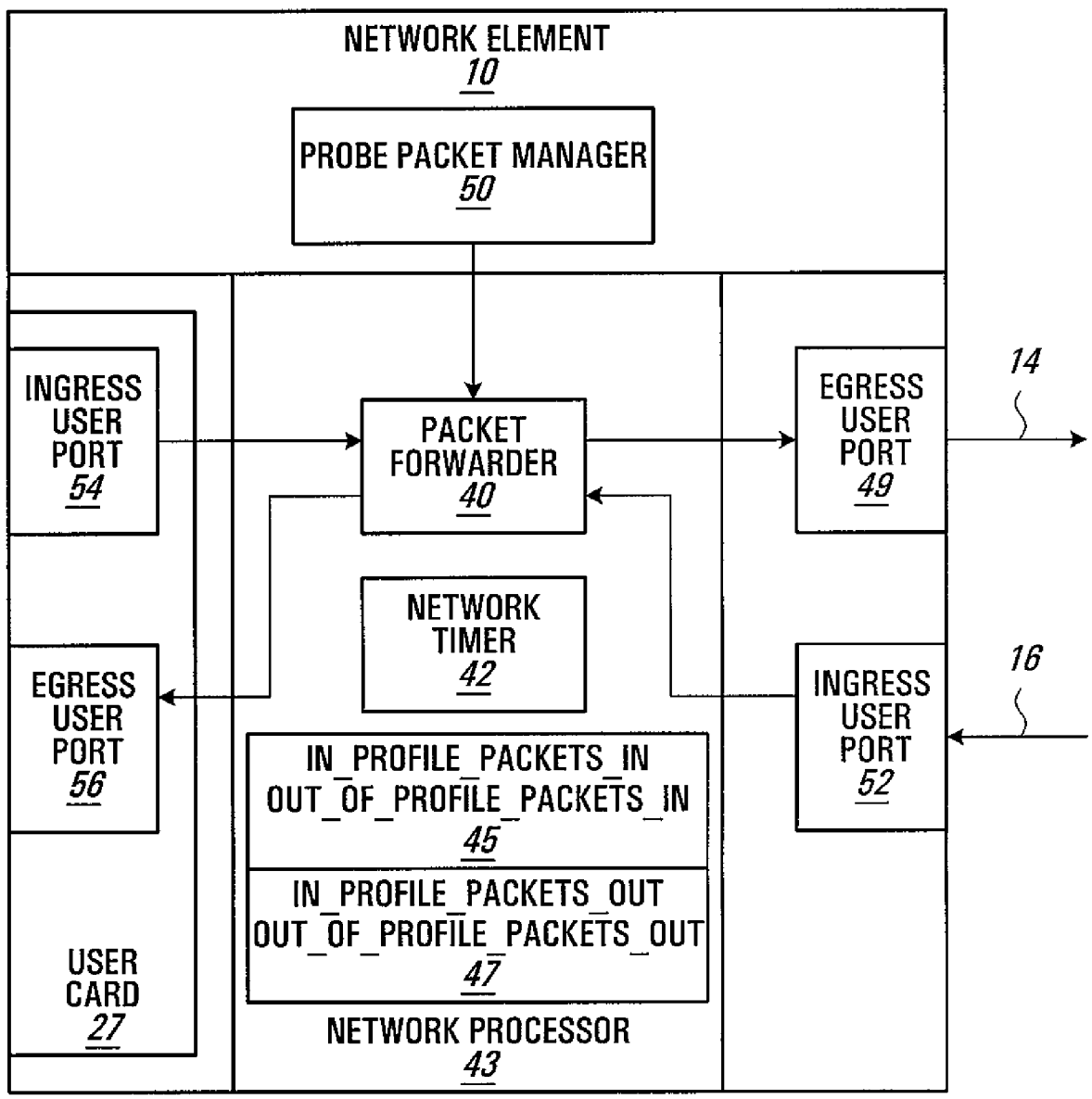
FIG. 2 is a block diagram of a network element of FIG. 1.

A more detailed block diagram of the functionality of the network element is provided in FIG. 2. Shown is user card 27 having an ingress user port 54 and an egress user port 56. Such a user card is provided for each of multiple external connections to the network element. On the network side, shown is an egress network port 49 and an ingress network port 52. The network element 10 has a packet forwarder 40 having a network timer 42. The packet forwarder 40 and network timer 42 in this embodiment are assumed to be part of a network processor 43. The functionality of the first and second network elements 10,12 is the same. However, for a given round trip service, one of the two network elements is the site of probe packet generation. For the examples described herein, this is the first network element 10. The packet forwarder 40 performs real time (or as close to real time as practical) processing of input data packets. Each packet received at an ingress user port belonging to a given service is typically given a certain treatment, and forwarded to an appropriate egress network port. A count of these packets is maintained for each service. Similarly, packets received by ingress network ports are forwarded to an appropriate egress user port, and count of such packets as maintained for each service. Preferably, a count is maintained for "in profile" packets, namely those which are accepted as conforming traffic, and "out of profile" packets which are those accepted as non-conforming traffic. {IN_PROFILE_PACKETS_IN, OUT_OF_PROFILE_PACKETS_IN} 45 and {IN_PROFILE_PACKETS_OUT, OUT_OF_PROFILE_PACKETS_OUT} 47 represent packets of a given service input at an appropriate ingress user port and packets of a given service output at a user egress port respectively. The network timer 42 has a clock, for example one with a 1 microsecond resolution.

The network element 10 also has a probe packet manager 50 which is preferably implemented on a different processor than the network processor 32 (or other hardware implementing the packet forwarding) so as to have minimal impact on the real time forwarding capabilities of the network element 10. The probe packet manager 50 operates in its own time domain which need not be synchronized with the time of the network timer 42 or with the probe packet manager or network timer on the destination network element. In preferred embodiments, such a probe packet manager resides on all the network elements within the network to allow the introduction of probe packets from any point within the network.

The probe packet manager 50 is adapted to generate probe packets for each service and pass these to the packet forwarder 40 such that they are included in the egress packet stream for each service. For IP networks, the probe packets will each take the form of a standard IP packet, with enough empty packet payload space to collect the time and packet information from the first and second network elements. In a preferred embodiment, the probe packet structure has the fields illustrated in the table of FIG. 3 described below.

The destination network element (not shown) has the same arrangement, including a packet forwarder with network timer, IN_PROFILE_PACKETS_IN count, OUT_OF_PROFILE_PACKETS_IN count, IN_PROFILE_PACKETS_OUT count, OUT_OF_PROFILE_PACKETS_OUT count, and there is a probe packet manager.

Referring now to FIG. 3, the example probe packet structure has a source transmission time field which is a four byte time inserted by the network processor as soon as the probe packet is received for processing by the first network element. The source receive time is a four byte time inserted by the network processor when the probe packet is received back from the destination network element. The destination receive time is a four byte time inserted by the destination network processor when it receives the probe packet from the first network element. The destination transmission time is a four byte time inserted by the destination network processor just before it transmits the probe packet to the first network element. The eight byte transmission packet count contains the most recent in profile transmit packet count IN_PROFILE_PACKETS_IN maintained by the network processor on the first network element. Similarly, the eight byte receive packet count contains the most recent received in profile packet count IN_PROFILE_PACKETS_OUT maintained by the network processor on the first network element. Each probe packet is wrapped with a path label, for example an MPLS label stack. Each probe packet has the same class of service as the particular path with which the probe packet is to be associated. For MPLS, the MPLS label stack has class of service information embedded within. More generally, the probe packet must have a label or labels which will result in the probe packet being treated within the network the same as other regular data packets for the same path.

For networks in which IP packets are encapsulated in Ethernet, the above probe packet structure satisfies the requirement for a payload data size of between 38 and 1492 bytes (IEEE Standard Number 802.2/802.3) to conform to the size requirements of an Internet Protocol packet. There is also 6 bytes (IEEE Standard Number 802.2/802.3) that must be occupied for the IP header. The packet forwarder populates the IP header with the pertinent type and address information before transporting the packet. If the IP packet payload was less than 38 bytes, then extra, un-used data fields have to be placed in the structure until a minimum of 38 bytes of data is achieved. The reason why the payload must be at least 38 bytes is because the upper layer Ethernet protocol can't encapsulate and send payload data across the optical network smaller than 38 bytes. Similarly, if the data in the payload was over 1492 bytes, the probe packet data would be truncated when it is encapsulated at the Ethernet level and instead of one packet being sent across the network, there would be two or more.

It is to be understood that the example of FIG. 3 contains very specific values for the field sizes and that these are not essential whatsoever to the invention. Any field size may be employed which is capable of containing the required information. It is important that the entire probe packet payload be transmitted as a single packet through the network, and depending on the particular protocol or protocols employed, this may place size restrictions, such as those discussed above for the IP over Ethernet example.

In order for probe packets to serve their purpose, they have to be treated by the network as if they are normal user data packets. In order for this to happen, the probe packets must undergo the same traffic policing, queuing and scheduling treatment as a similar user traffic of the same Class of Service. The packet forwarder 40 contains the policing, queuing and scheduling logic to determine which packets will be dropped and which will be passed during times of network congestion. A given stream of packets, after insertion of probe packets, will be referred to as a probe packetized stream of packets.

Probe packet creation takes place in the probe packet manager 50 and the probe packets thus created are passed to the packet forwarder 40. The probe packets include a special type indicator field to distinguish them from normal packets. Other than that, the path identification and class of service fields are filled in by the PPM 50, with remaining fields completed by the network processor as described below. Typically, each network processor is a chip that performs many packet processing functions. Most NPs are generalized packet processing devices containing optimizations for doing look-ups, policing, queuing and forwarding. Customized functionality is added by companies by writing program code that runs on the NP to perform the desired tasks. The NP's probe packet handling which reads the time stamp from the NP's network timer and also reads the packet counts from the NP's statistics memory, and inserts them into the appropriate spaces in the probe packet that was created by the PPM may be such a program that can be implemented by a third party and run on NP's. It is important to route the packets from the PPM 50 to as close to the ingress (incoming) port of the network element as possible. It is also important to have the most up to date time and packet count information possible. Therefore, the logical place to receive the time and packet information is at the network element ingress. Once the two pieces of data are placed on the outgoing probe packet, the packet is added to the regular traffic processing infrastructure (policing, queuing and scheduling). The packet forwarder examines received packets and from the packet type indicated can tell if a packet is a probe packet. If it is, then the relevant time and packet count data is added.

When the probe packet arrives at the second network element, the packet forwarder of the second network element identifies the packet as a probe packet by examining the type of the packet, and extracts the packet, and forwards the packet to the PPM. The PPM, as soon as practically possible, turns the packet around, and injects it into the reverse packet stream by forwarding it to the packet forwarder. The destination network processor then fills in the field destination transmit time and fills in the packet counts seen at the destination. The probe packet then enters the regular traffic processing infrastructure and is eventually transmitted back to the first network element.

The first network element's probe packet manager examines received probe packets and collects the send and receive times as well as the starting and ending packet counts from the network elements. Once the probe packets have completed their round-trips and the aforementioned information becomes available, the packet latency is calculated by:

(Source receive Time)−(source transmission Time)−
(Destination Delay Time)=Latency The destination delay time is the time it takes for the second network element to process the probe packet and route the probe packet back to the first network element. The destination delay time can be calculated according to:

(Destination Transmission Time)−(Destination
Receive Time)=Destination Delay Time The packet loss is calculated each network element by:

(Receive Packet Count)−(transmission Packet
Count)=Loss

For each data path and for each Class of Service there will be both a latency and a loss calculation. For each path+class of service, the information collected from probe packets will be stored over an update period, for example by storing them in a dynamic vector container. At the end of each update period, the PPM processes the stored values for example by averaging them. Any suitable processing may be performed. In one embodiment, there are two dynamic vector containers so that when the PPM comes to collect the data every 15 minutes, the calculated data from incoming data packets can go into the second empty container. When the PPM is done collecting the information from the first container, the first container is cleared. By continually emptying the containers every update period, memory exceptions can be avoided.

The network processor is the processing center of each network element, all traffic that enters a particular ingress or egress user port has to be examined and processed accordingly by the network processor. This is primarily the reason why the network processor has a high operating speed, so that it does not become the bottleneck in the network.

In order for the network processor to be able to time-stamp the incoming probe packet, the network timer is provided to keep track of network time. The network timer maintains time for example to a granularity 1 microsecond or smaller. In one embodiment, the PPM adds the time information to the probe packets and then ships them out to the network processor for transmission. As soon as the packet reaches the network processor, the time-marked packet would be sent along the same data path as user traffic. In another embodiment as detailed previously, the packets are generated at the PPM, but the network processor places the outgoing time and packet information from the network processor hardware time register and network processor count register just before the packet is sent.

Both embodiments have their advantages and disadvantages. By providing the time-stamp information and the packet count at the PPM, in effect a non-deterministic packet delay that no computational algorithm can compensate or predict is introduced. Due to this delay, the packet count received at the PPM may not reflect accurately the outgoing packet count at the network processor. Furthermore, this delay does not model regular traffic since packets of user traffic originate at the ingress port of the network processor and not the PPM. The delay in transporting the packet from the PPM to the ingress port of the network element may be significant because the depth of the traffic queue as well as traffic congestion directly affects the communication time and sequence between the PPM and the network processor. Due to these two varying factors, the time-stamped information on the packet may lack sufficient accuracy. However, this method has the advantage of being incredibly easy to implement in that hardware and software knowledge at the network processor does not need to be added to make sure it is able to place the time-stamp and packet loss information.

On the other hand, having the probe packet receive the time and packet information from the network processor would be the most accurate approach and produce delay data that is most meaningful in monitoring SLAs. Another advantage of this method is that it will discount the non-deterministic communication delay between the PPM and the network processor.

Probe packets are transported via existing data paths carrying user traffic. Using existing data paths allow for the delay and packet measurements to be more indicative of the Class of Service. The amount of delay and packet loss experienced by different services (due to different buffering and policing of each service) is quite different from service to service. In other words, not all services have the same benchmark delay. Therefore, the probe packets must utilize the same data paths as regular service specific traffic to experience similar conditions. It is only at the second network element where the packet type information will be examined to determine the identity of the probe packet.

Transferring probe packets across the network requires them to be readily identifiable by the entities that will be acting on these packets. The PPM and the network processor must be able to tell when a probe packet has arrived and trigger the necessary sequence of pre-programmed events. Above, packet type information is introduced to achieve this. In the MPLS context for example embodiment, each probe packet is wrapped with a label stack. In MPLS label stacks, each label has an S bit which set to 0 or 1 depending on whether the label is the bottom of the stack or not. Where a normal user packet would have a label X corresponding to the label that is the bottom-of-stack, a probe packet would have another label inside label X, and the label X for the probe packet would thus have its S bit set to 0 to indicate that it was not the bottom of the stack. Further, inside the IP packet, a designated IP protocol number is used to denote that the content of the particular packet is a Probe Packet. The value that is used is irrelevant as long as both ends use the same value.

As indicated in the discussion of FIG. 1, somewhere in the network, a user interface 12 is provided which allows the probe packet characteristics to be specified. This might involve specifying whether or not probe packets are to be generated for a given path/CoS, and the frequency of generating such packets, and the frequency of updating the performance characteristics. For example, meaningful results may be obtained with probe packets transmitted every minute, and with the performance characteristics updated every fifteen minutes. Of course alternative timings may be employed.

The PPM needs to schedule the transmission of a probe packet across the network for each path/CoS combination being monitored in accordance with the requirements for the particular path/CoS. For example, if probe packets are to be inserted at most every minute for a given path/CoS, then the PPM may schedule itself every minute, generate all the required probe packets and send them out. It is to be understood there are many ways of scheduling periodic processes, and this invention is not limited to any particular one.

This may for example be achieved by generating a software interrupt to control the periodic behaviour. This may for example be achieved with an infinite repeating for-loop software structure to generate the interrupts every minute. Alternatively, an operating system's inherent timing interrupt function may be used.

Figure 4:
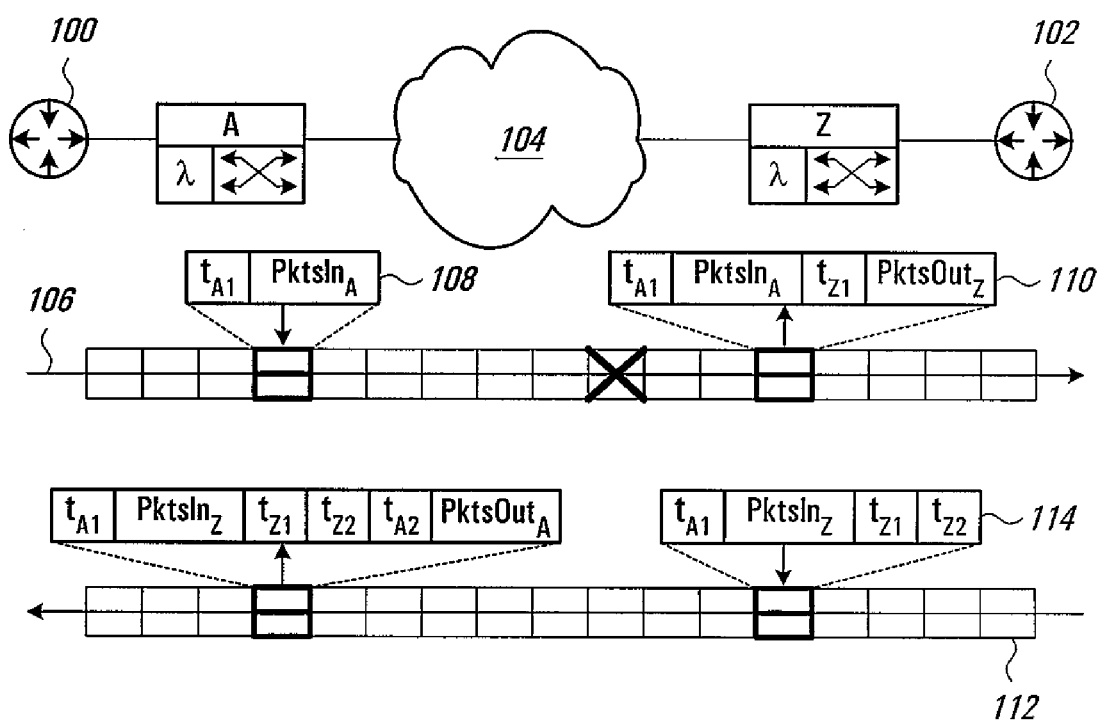

Referring now to FIG. 4, a detailed example of how the probe packet is used will be presented. In this example, all packet counts are in profile packet counts. In embodiments in which out of profile packet counts are also maintained, an out of profile packet loss could be determined as well. A first user node 100 is shown connected to a source network element A through a network 104 to a destination network element Z and second user node 102. Within a flow of packets 106 being sent by network element A from the first user node 100 to the second user node 102 is inserted a first probe packet 108. The probe packet has the fields $t_{A1}$ and $PktsIn_A$ filled in indicating the most current network processor time, and the most recent number of packets received from the first user node 100 for the second user node 102 respectively. The probe packet 108 with the fields thus completed is then sent through the network 104 like any other packet. When the probe packet is received by the destination network element Z, it is extracted and then updated to include a time or reception of the packet $T_{Z1}$, and a count $PktsOut_Z$ of how many packets from the first user node for the second user node have been received and the probe packet 110 is then forwarded to the PPM. At egress, $PktsOut_Z$ and $PktsIn_A$ should be equal and in the event they are not $PktsIn_A$ minus $PktsOut_Z$ represents packets lost on the path from the source network element A to the destination network element Z.

The probe packet is then turned around for the return trip to the source network element. At this point, the fields of interest include $t_{A1}$, $PktsIn_Z$ (the most recent count of the number of packets from the second user node 102 for the first user node 100), $t_{Z1}$, and $t_{Z2}$ which is the time of insertion of the probe packet 114 at the destination network element Z. A stream of packets 112 including the probe packet 114 is sent to the source network element A through the network 104. When the probe packet is received at the source network element A, the fields $t_{A2}$ and $PktsOut_A$ are filled in representing the time or reception of the probe packet and the current number of packets received from the second user node 102 for the first user node 100 respectively. At egress, $PktsOut_A$ and $PktsIn_Z$ should be equal and in the event they are not $PktsOut_A$ minus $PktsIn_Z$ represents packets lost on the path from the destination network element Z to the source network element A.

The probe packet is forwarded to the PPM of the source network element A. Next, the calculation $T_{A2}-T_{A1}-(T_{Z2}-T_{Z1})$ is made and this measures data-plane only round trip delay. Because the time stamps are added in the packet forwarding function, the delay does not include any component due to control plane delay which is not representative of actual forwarding of a data packet.

This provides accurate, directional packet loss measurement in which all sources of statistical error removed.

Preferably, the node is configured to emit a trap or other suitable signal when one or more configurable packet loss thresholds are exceeded.

Preferably, for the round-trip delay measurements, the node is configured to emit a trap or other suitable signal when one or more configurable delay thresholds are exceeded.

Preferably, packets are inserted Per-COS per path and therefore measures queuing delays experienced by the given COS/service. As indicated previously, preferably, the method measures in-profile user packets (according to ingress policer). The services purchased from a carrier often include a "guaranteed" rate 'x' at which packets are always supposed to be passed. If the user sends at a higher rate 'y' the policer will 'mark' the packets at the rate y-x as out of profile and not subject to the guarantees for the packets conforming to rate 'x'. This means that packets up to 'x' are guaranteed, and y-x is more likely to be dropped if congestion occurs.

Preferably, the insertion rate of the probe packets is configurable, and also, the probe packet is configurable on/off per service.

In another embodiment of the invention, the above described probe packets are used to allow a measurement of one-way jitter to be produced. Jitter is defined as variance in delay. Drift is defined as the variance in time differential.

If the difference in time between two nodes (Node A and Node Z) varies slowly (i.e. slow drift) relative to the period between probe packets, then accurate one-way jitter can be measured.

Figure 5:
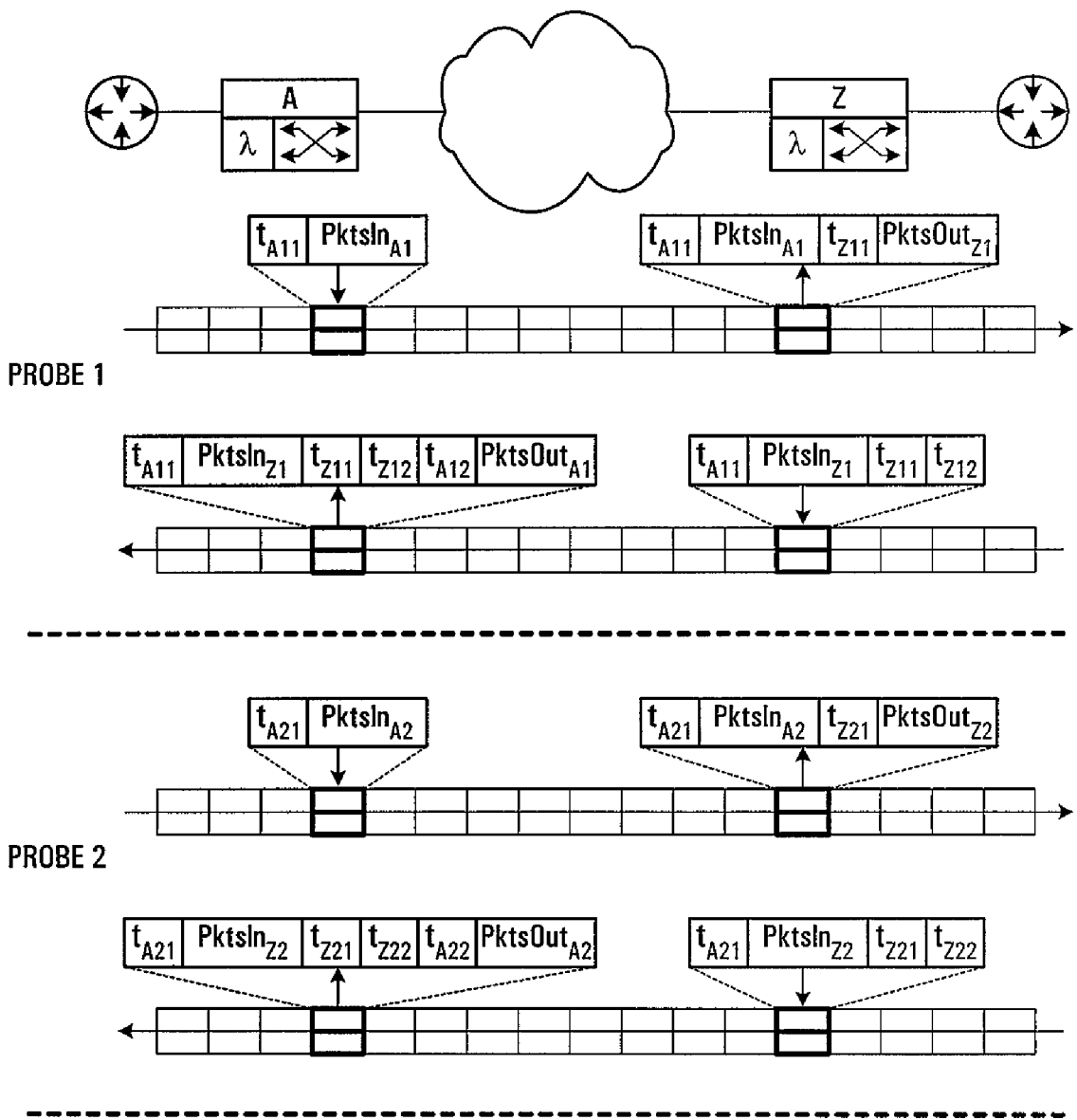
FIG. 5 shows an example of round trip packets being used to measure one way jitter.

Referring now to FIG. 5, $T_{Xij}$ is the time measured in timing domain of Node X Probe Packet i, step j. $\Delta_{Azi}$ is the change to be applied to transform timing in Node A's timing domain into Node Z's timing domain at instant i. Delay$_{Azi}$ is a one-way delay for probe packet i from A to Z measured in network node A's timing domain.

A probe packet is issued at A at Time $T_{A11}$ (time measured in timing domain of Node A). It is received at Node Z at time $T_{Z11}$ (time measured in timing domain of Z).

By definition:

$$T_{Z11} = T_{A11} + \text{Delay}_{AZ1} + \Delta_{AZ1}$$

$$T_{Z21} = T_{A21} + \text{Delay}_{AZ2} + \Delta_{AZ2}$$

Rearrange to get $$\text{Delay}_{AZ1} = T_{Z11} - T_{A11} - \Delta_{AZ1}$$

$$\text{Delay}_{AZ2} = T_{Z21} - T_{A21} - \Delta_{AZ2}$$

$$\text{Jitterhd } AZ1\text{-}2 = \text{Delay}_{AZ2} - \text{Delay}_{AZ1} = (T_{Z21} - T_{A21}) - (T_{Z11} - T_{A11}) - (\Delta_{AZ2} - \Delta_{AZ1})$$

If the drift is small $$(\Delta_{AZ2} - \Delta_{AZ1}) << (T_{A11} - T_{A21}) \text{ for instance}$$

Or $$(\Delta_{AZ2} - \Delta_{AZ1}) \approx 0$$

Thus one-way jitter can be expressed as:

$$\text{Jitter}_{AZ1\text{-}2} = (T_{Z21} - T_{A21}) - (T_{Z11} - T_{A11})$$

Accuracy will be within drift. This is a uni-directional calculation. By reversing the 'A's and the 'Z's, the jitter in the other direction can be calculated.

It is noted that for latency measurements bi-directional probe packet flow is a requirement. However, for jitter and packet loss, these can be implemented for uni-directional probe packet flow.

Numerous modifications and variations of the present invention are possible in light of the above teachings. It is therefore to be understood that within the scope of the appended claims, the invention may be practised otherwise than as specifically described herein.

We claim:

1. A method of measuring latency in a network comprising for each source, first network element, second network element, destination, service level parameter permutation for which latency is to be measured:

at a first network element, receiving a first stream of packets from a source, the first stream of packets having at least one associated service level parameter;

at the first network element, on an ongoing basis and independently of said source inserting into the first stream of packets a probe packet to produce a first probe packetized stream of packets, each probe packet containing a respective source transmit time which represents first network element time at a time of insertion of the probe packet;

the first network element processing and forwarding each packet of the first probe packetized stream of packets in accordance with the at least one associated service level parameter;

at a second network element, receiving the first probe packetized stream of packets;

the second network element extracting each probe packet and adding to each probe packet a respective destination receive time which represents second network element time at a time of extraction of the probe packet;

the second network element receiving a second stream of packets from the destination, the second stream of packets having at least one associated service level parameter;

the second network element independently of the destination inserting into the second stream of packets each extracted probe packet to produce a second probe packetized stream of packets after adding to each extracted probe packet a respective destination transmit time which represents second network element time at a time of insertion of the probe packet;

the second network element processing and forwarding each packet of the second probe packetized stream of packets in accordance with the at least one associated service level parameter;

the first network element receiving the second probe packetized stream of packets;

the first network element extracting each probe packet from the second probe packetized stream of packets and adding to each probe packet a respective source receive time which represents first network element time at a time of extraction of the probe packet; and the first network element using the source transmit network time, the destination receive time, the destination transmit time, and the source receive time to compute a latency for each probe packet.

2. A method according to claim 1 wherein each probe packet comprises a packet which satisfies constraints of a protocol layer within which the, packet resides, and has a type indication allowing each probe packet to be extracted at the first network element and the second network element.

3. A method according to claim 2 wherein the first stream of packets and the second stream of packets are IP packets, and each probe packet is an IP packet.

4. A method according to claim 3 wherein a type indication allowing each probe packet to be extracted at the first network element and the second network element is added by:
routing each packet through the network using an MPLS label stack including a lowest level label;
for each packet which is one of said probe packets, adding a label below the lowest level label indicating the packet is a probe packet.

5. A method according to claim 1 further comprising for each source, first network element, second network element, destination, service level parameter permutation:
the first network element maintaining a respective first count of how many packets have been received from the source for transmission to the destination and including an up to date value of the first count in each probe packet transmitted from the first network element to the second network element;
the second network element maintaining a respective second count of how many packets have been received from the source for forwarding to the destination;
for each probe packet received at the second network element, determining a packet loss for transmission from the source to the destination by subtracting the second count from the first count.

6. A method according to claim 5, further comprising for each source, first network element, second network element, destination, service level parameter permutation:
the second network element maintaining a respective third count of how many packets have been received from the destination for transmission to the source and including an up to date value for the third count in each probe packet transmitted from the second network element to the first network element;
the first network element maintaining a respective fourth count of how many packets have been received from the destination for forwarding to the source;
determining a packet loss for transmission from the destination to the source by subtracting the third count from the fourth count.

7. A method according to claim 1 further comprising:
using the source transmit time, the destination receive time, the destination transmit time, and the source receive time to calculate a first estimate of one way jitter for traffic from the first network element to the second network element and a second estimate of one way jitter for traffic from the second network element to the first network element.

8. A method according to claim 7 wherein one way jitter is computed according to:

$$\text{Jitter}_{AZ1-2} = (T_{Z21} - T_{A21}) - (T_{Z11} - T_{A11})$$

wherein $T_{Aij}$ is a time measured in timing domain of a network element A probe packet i, step j, and $T_{Zij}$ is a time measured in timing domain of a network element Z, wherein the network element A is the first network element and the network element Z is the second network element for said first estimate of one way jitter, and wherein the network element A is the second network element and the network element Z is the first network element for the second estimate of one way jitter.

9. A method according to claim 1 wherein for each source, first network element, second network element, destination, service level parameter permutation the method further comprising:
the first network element combining latencies of multiple probe packets to determine an average latency for round trip packet transmission for the source, first network element, second network element, destination, service level parameter permutation.

10. A method according to claim 1 further comprising:
receiving a request for probe packet insertion in respect of the first stream of packets;
wherein at the first network element, inserting into the first stream of packets probe packets to produce the first probe packetized stream of packets is done in accordance with the request.

11. A method according to claim 1 wherein the latency for each probe packet is computed according to:
source receive time−(destination transmit time−destination receive time)−source transmit time.

12. A method according to claim 1 further comprising:
generating each probe packet in a separate processor from a network processor used for regular packet forwarding so as to minimize effects of real time behaviour in packet forwarding, with an exception of the network processor adding the source transmit time so as to allow the source transmit time to be as accurate as possible, and not introduce overheads involved in probe packet generation and insertion into the first stream of packets.

13. A method according to claim 1 further comprising:
generating each probe packet in a separate processor from a network processor used for regular packet forwarding so as to minimize effects of real time behaviour in packet forwarding, with an exception of the network processor adding the destination transmit time so as to allow the destination transmit time to be as accurate as possible, and not introduce overheads involved in probe packet generation and insertion into the second stream of packets.

14. A network element comprising a first input port, a first packet forwarder and a first probe packet manager;
the first input port receiving a first stream of packets from a source for a destination, the first stream of packets having at least one associated service level parameter;
the first probe packet manager, on an ongoing basis and independently of said source, generating a probe packet and passing each probe packet to the first packet forwarder;
the first packet forwarder adding to each probe packet a respective source transmit time, which represents a current network time, and inserting the probe packet into the stream of packets to generate a first probe packetized stream of packets;
the first packet forwarder further forwarding each packet of the first probe packetized stream of packets on towards the destination in accordance with the at least one associated service level parameter.

15. A network element according to claim 14 in combination with a network comprising a second network element, the second network element comprising a second input port, a second packet forwarder, and a second probe packet manager;
the second input port receiving a second stream of packets from the destination for the source;
the second packet forwarder receiving the first probe packetized stream of packets, and adding to each probe packet as the probe packet is received a destination receive time, and passing the probe packet to the second probe packet manager;

the second probe packet manager passing each probe packet received back to the second packet forwarder;

the second packet forwarder adding to each probe packet received from the second probe packet manager a respective destination transmit time which represents a current network time, and inserting the probe packet into the second stream of packets to generate a second probe packetized stream of packets;

the second packet forwarder further forwarding each packet of the second probe packetized stream of packets on towards the source in accordance with the at least one associated service level parameter;

the first packet forwarder further receiving the second probe packetized stream of packets, and adding to each probe packet received a respective source receive time, which represents first network element time at a time of extraction of the probe packet, and passing the probe packet to the first probe packet manager;

the first probe packet manager further computing a packet latency for each probe packet using the source transmit network time, the destination receive time, the destination transmit time, and the source receive time.

16. A network according to claim 15 wherein for each source, first network element, second network element, destination, service level parameter permutaton the first probe packet manager is further combining latencies of multiple probe packets to determine an average latency for round trip packet transmission for the source, first network element, second network element, destination, service level parameter permutation.

17. A network according to claim 16 further comprising a user interface through which to receive a request for probe packet insertion in respect of the first stream of packets;
wherein the first probe packet manager generates probe packets in accordance with the request.

18. A network according to claim 15 wherein the second network element is using the source transmit time, the destination receive time, the destination transmit time, and the source receive time to calculate a first estimate of one way jitter for traffic from the first network element to the second network element.

19. A network according to claim 18 wherein one way jitter is computed according to:

$$\text{Jitter}_{AZ1-2} = (T_{Z21} - T_{A21}) - (T_{Z11} - T_{A11})$$

wherein $T_{Aij}$ is the source transmit time for probe packet i, step j, and $T_{Zij}$ is the destination receive time.

20. A network according to claim 15 wherein the latency for each probe packet is computed according to:

source receive time−(destination transmit time−destination receive time)−source transmit time.

21. A network according to claim 15 wherein for each source, first network element, second network element, destination, service level parameter permutation:

the first packet forwarder is maintaining a respective first count of how many packets have been received from the source for transmission to the destination and to include an up to date value of the first count in each probe packet transmitted from the first network element to the second network element;

the second packet fonNarder is maintaining a respective second count of how many packets have been received from the source for forwarding to the destination and to determine a packet loss for transmission from the source to the destination by subtracting the second count from the first count.

22. A method of measuring one way jitter in a network comprising for each source, first network element, second network element, destination, service level parameter permutation for which one way jitter is to be measured:

at a first network element, receMng a first stream of packets from a source, the first stream of packets having at least one associated service level parameter;

at the first network element, on an ongoing basis and independently of said source inserting into the first stream of packets a probe packet to produce a probe packetized stream of packets, each probe packet containing a respective source transmit time which represents first network element time at a time of insertion of the probe packet;

the first network element processing arid forwarding each packet of the probe packetizeci stream of packets in accordance with the at least one associated service level parameter;

at a second network element, receiving the probe packetized stream of packets;

the second network element extracting each probe packet and determining a respective destination receive time which represents second network element time at a time of extraction of the probe packet;

using the source transmit time and the destination receive time to calculate an estimate of one way jitter for traffic from the first network element to the second network element.

23. A method according to claim 22 wherein one way jitter is computed according to:

$$\text{Jitter}_{AZ1-2} = (T_{Z21} - T_{A21}) - (T_{Z11} - T_{A11})$$

wherein $T_{Aij}$ is the source transmit time for probe packet i, step j, and $T_{Zij}$ is the destination receive time for probe packet i, step j.

24. A method of measuring packet loss in a network comprising for each source, first network element, second network element, destination, service level parameter permutation for which packet loss is to be measured:

at a first network element, receiving a first stream of packets from a source, the first stream of packets having at least one associated service level parameter;

the first network element maintaining a respective first count of how many packets have been received from the source for transmission to the destination;

at the first network element, on an ongoing basis and independently of said source inserting into the first stream of packets a probe packet to produce a probe packetized stream of packets, each probe packet containing a most recent value for the first count;

the first network element processing and forwarding each packet of the probe packetized stream of packets in accordance with the at least one associated service level parameter;

at a second network element, receiving the probe packetized stream of packets;

the second network element maintaining a respective second count of how many packets have been received from the source for forwarding to the destination;

the second network element extracting each probe packet from the probe packetized stream of packets and determining a packet loss for transmission from the source to the destination by subtracting the second count from the first count.

* * * * *

UNITED STATES PATENT AND TRADEMARK OFFICE
CERTIFICATE OF CORRECTION

| | | |
|---|---|---|
| PATENT NO. | : 7,127,508 B2 | Page 1 of 1 |
| APPLICATION NO. | : 10/134553 | |
| DATED | : October 24, 2006 | |
| INVENTOR(S) | : K.R. Edmison et al. | |

It is certified that error appears in the above-identified patent and that said Letters Patent is hereby corrected as shown below:

Column 14, line 65, "the," is corrected to read as --the--.

Column 15, line 62, "element and" is corrected to read as --element, and--.

Column 17, line 62, "packet fonNarder" is corrected to read as --packet forwarder--.

Column 18, line 5, "element, receMng a" is corrected to read as --element, receiving a--.

Column 18, line 15, "processing arid forwarding each packet of the probe packetizeci stream" is corrected to read as --processing and forwarding each packet of the probe packetized stream--.

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,127,508 B2  Page 1 of 1
APPLICATION NO. : 10/134553
DATED : October 24, 2006
INVENTOR(S) : K. R. Edmison et al.

It is certified that error appears in the above-identified patent and that said Letters Patent is hereby corrected as shown below:

Column 17, line 18, "first" is corrected to read as --the--.

Column 17, line 25, after "network" insert --element--.

Column 17, line 26, "first" is corrected to read as --the--.

Column 17, line 26, after "element" insert --the--.

Column 17, line 27, after "permutation" insert --:--.

Column 17, line 30, "first" is corrected to read as --the--.

Column 17, line 31, after "element" insert --the--.

Column 17, line 31, after "element" insert --the--.

Column 17, line 31, after "destination" insert --and the--.

Column 17, line 33, after "network" insert --element--.

Column 17, line 38, after "network" insert --element--.

Column 17, line 42, after "from the" delete "first".

Column 17, line 44, after "network" insert --element--.

Column 17, line 51, after "A" insert --element--.

Column 17, line 54, after "A" insert --element--.

Column 17, line 55, "first" is corrected to read as --the--.

Column 17, line 55, after "element" insert --the--.

Column 17, line 61, after "from the" delete "first".

Signed and Sealed this

Twenty-third Day of November, 2010

David J. Kappos
*Director of the United States Patent and Trademark Office*